Patented Mar. 25, 1924.

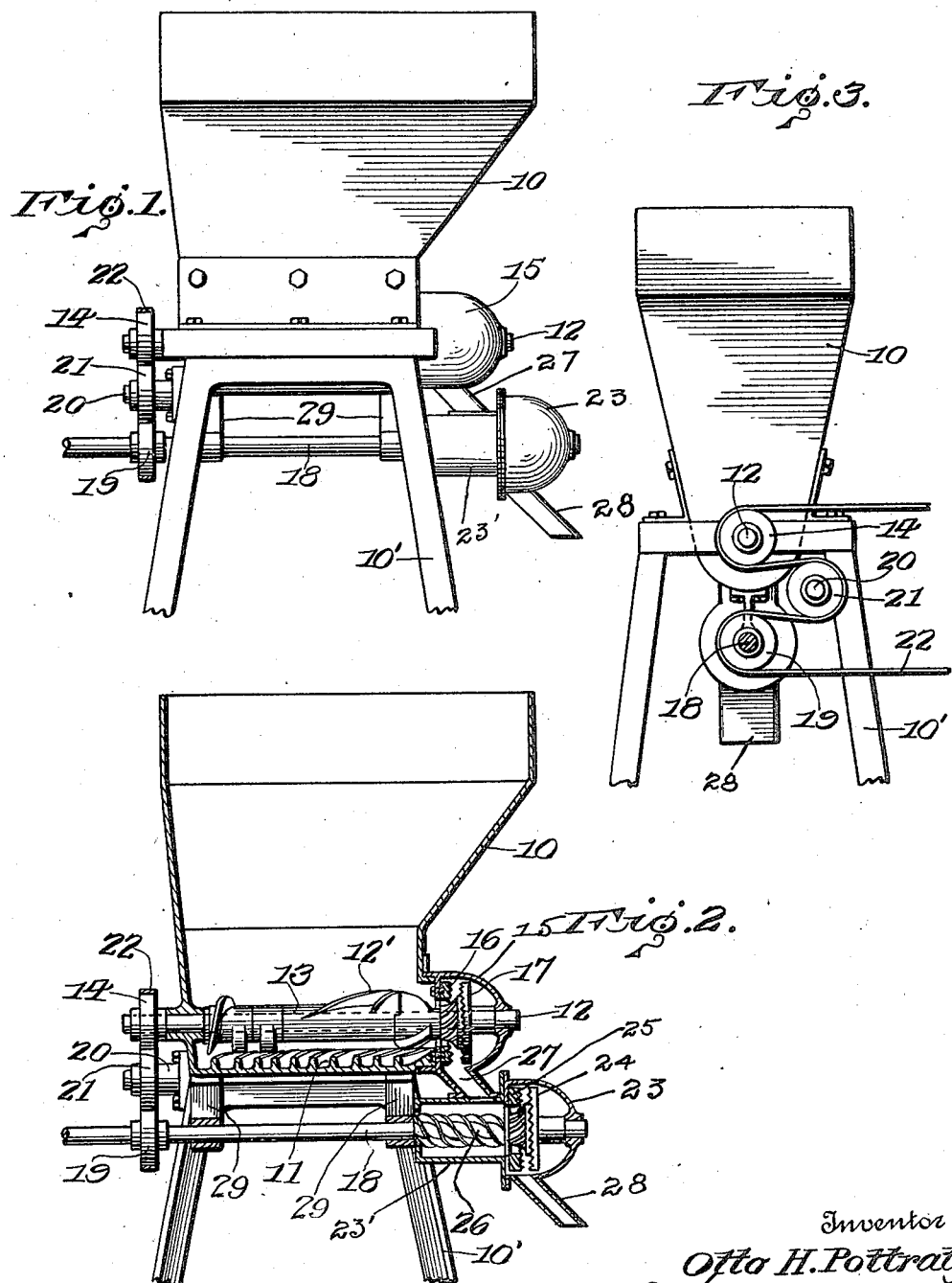

1,488,166

UNITED STATES PATENT OFFICE.

OTTO H. POTTRATZ, OF NEW ALBIN, IOWA.

FEED-GRINDING MILL.

Application filed September 9, 1921. Serial No. 499,373.

*To all whom it may concern:*

Be it known that I, OTTO H. POTTRATZ, a citizen of the United States, residing at New Albin, in the county of Allamakee, State of Iowa, have invented certain new and useful Improvements in Feed-Grinding Mills; and I do hereby declare the following to be a full, clear, and exact description of the invention, such as will enable others skilled in the art to which it appertains to make and use the same.

This invention relates to new and useful improvements in corn crushing and grinding machines.

In a large number of machines of this type, now on the market, and especially the type known as the "International", difficulty has been experienced by reason of the fact that the corn is not fed to the grinding rolls or disks with sufficient speed. The crushing rolls do not operate at the proper speed to keep the grinding rolls or disk adequately supplied with grain.

It is to overcome this particular objection that the present invention is devised.

The present contemplates the use of a separate shaft for the grinding rolls from that on which are the crushing rolls, and so intergearing them that the crushing rolls will be operated at a greater speed than the grinding rolls.

Other objects and advantages will be apparent from the following description when taken in connection with the accompanying drawing.

In the drawing:

Figure 1 is a side elevation of a crushing and grinding machine equipped with the improvement.

Figure 2 is a vertical longitudinal central sectional view through the machine.

Figure 3 is an end view of the machine showing the intergearing between the shafts.

Referring particularly to the accompanying drawings, 10 represents the hopper into which the corn, to be crushed and ground, is fed. In the bottom of the hopper is the ribbed concave 11, and extending longitudinally in the hopper, above the concave, is a shaft 12, and mounted on this shaft and rotating in the concave, is the crushing roll 13. On one end of the shaft 12, externally of the hopper, is a belt wheel or pulley 14, the purpose of which will be later described. The hopper is mounted on a suitable stand 10'. The other end of the shaft 12 extends through the end wall of the bottom of the hopper and is journaled in the casing 15, which is carried by the hopper wall, externally of the hopper. Rigidly secured within the opening of the said end wall of the hopper is a stationary grinding element 16, in the form of a flat ring, the grinding face of which is directed outwardly, the shaft 12 being arranged to rotate centrally within the opening of the ring, as clearly seen in the sectional view Figure 2. Rigidly carried by the shaft 12, outwardly of the ring 16, and having its grinding face directed toward the corresponding face of the ring 16, is the rotatable grinding disk 17, the same rotating with the shaft 12.

The frame is provided with the depending brackets 29 in which is rotatably mounted a second shaft 18, one end of which is provided with a pulley 19, arranged below the pulley 14. Mounted on the frame 10', between the ends of the shafts 12 and 18, is a short stub shaft 20, which carries a pulley 21, and engaged around these pulleys, in the manner shown in Figure 3, is a driving belt 22. Below the casing 15 is a second similar casing 23 which rotatably supports the adjacent end of the shaft 18, said shaft carrying a grinding disk 24, whose grinding face is directed inwardly. Secured to the casing 23 and surrounding the adjacent end of the shaft 18 is the ring grinding element 25 which cooperates with the disk 24 to grind the corn. Inwardly of the casing 23, and connected therewith, is a housing 23' through which the shaft 18 passes. On the shaft 18, within the housing 23' is a feed screw 26 which forces the corn to the grinding elements 24 and 25. Connecting the casing 15 with the casing 23, is a chute 27 through which the corn ground by the grinding elements 16 and 17 passes on its way to the grinding elements 24 and 25. A second chute 28 leads from the bottom of the casing 23 to discharge the completely ground corn to a receptacle placed therebelow.

In the operation of the device, the corn is placed in the hopper and shafts set in motion. The corn is partly crushed by the shaft 12 and the concave 11, while the spiral fin or web 12', passes the corn forwardly through the center of the ring 16, between said ring and the disk 17. The corn is ground to a certain degree and then falls through the chute 27 into the housing 23, where it is fed to the disks 24 and 25, which further grind it to the desired fineness, the ground corn finally escaping through the chute 28 to a receptacle below.

If desired the upper pulley 14 may be supplemented by a pulley of different diameter so that the speed of the shaft 12 may be rotated at a higher or lower rate than the shaft 18. This is sometimes advantageous, that the upper grinding elements may act on the corn and feed the same to the lower disks at a constant rate, which was not possible in similar devices heretofore.

What is claimed is:

The combination with a hopper having a shaft extending therethrough and provided with crushing means within the hopper and grinding means exteriorly thereof, and a casing enclosing the grinding means and supporting the extended end of the shaft, of a pair of depending brackets carried by the hopper, a shaft rotatably mounted within the brackets, a feed screw carried by one end portion of the shaft, an independent casing enclosing said screw, grinding means carried by the said shaft outwardly of the said casing, an independent cover for the grinding means, a chute leading from the said cover, and a second chute extending from the first mentioned casing to the feed screw casing.

In testimony whereof, I affix my signature, in the presence of two witnesses.

OTTO H. POTTRATZ.

Witnesses:
P. H. FREIBERG,
WM. THOMPSON.